United States Patent [19]

Rautakoura

[11] Patent Number: 4,493,579
[45] Date of Patent: Jan. 15, 1985

[54] SUPPORT TUBE FOR A TUBULAR ASSEMBLY AND METHOD FOR THE MANUFACTURE THEREOF

[75] Inventor: Timo Rautakoura, Lapinlahti, Finland

[73] Assignee: Varpaja Oy, Varpaisjarvi, Finland

[21] Appl. No.: 339,179

[22] Filed: Jan. 13, 1982

[30] Foreign Application Priority Data

Jan. 22, 1981 [FI] Finland ................................. 810173

[51] Int. Cl.³ .............................................. F16B 7/00
[52] U.S. Cl. ................................... 403/237; 403/234; 256/65
[58] Field of Search ............................ 256/65, 21, 22; 285/192; 403/174, 178, 407, 347, 274, 237, 234, 271, 272

[56] References Cited

U.S. PATENT DOCUMENTS

| 2,150,651 | 3/1939 | Ewing | 403/201 |
| 3,497,245 | 2/1970 | Metzger | 403/347 X |
| 3,817,047 | 6/1974 | Hampton | 285/192 X |
| 4,316,503 | 2/1982 | Kurachi et al. | 285/192 X |

FOREIGN PATENT DOCUMENTS

| 2076925 | 12/1981 | United Kingdom | 403/347 |
| 691621 | 4/1978 | U.S.S.R. | 403/347 |

Primary Examiner—Andrew V. Kundrat
Attorney, Agent, or Firm—Hill, Van Santen, Steadman & Simpson

[57] ABSTRACT

Support tube for a tubular assembly, particularly a vertical post for a railing, step of a ladder etc. at least one end of which is provided with an arcuate space into which a crossing tube can be fitted. At the arcuate edge of said arcuate space the wall of said support tube is bent into a protruding support extension (2). The support extension has been produced so that, prior to cutting the support tube to a desired length, a hole is drilled through its wall at the cutting line and the hole edges have been pulled out to form a collar protruding from the tube, whereafter the support tube is cut so that said collar is divided into extended support arches (2) which remain at the ends of separate support tubes.

3 Claims, 5 Drawing Figures

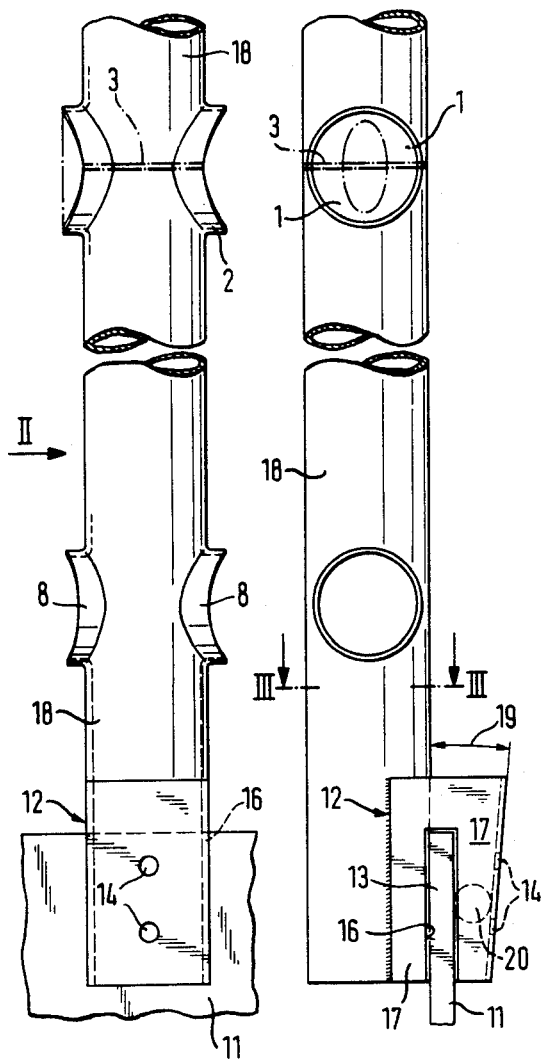
Fig. 4
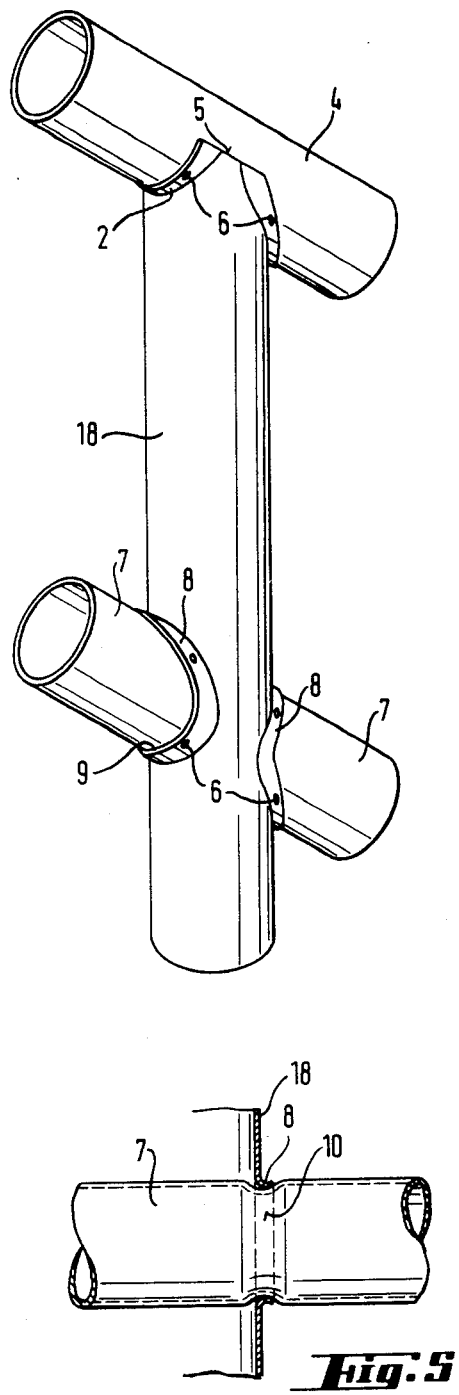
Fig. 1  Fig. 2
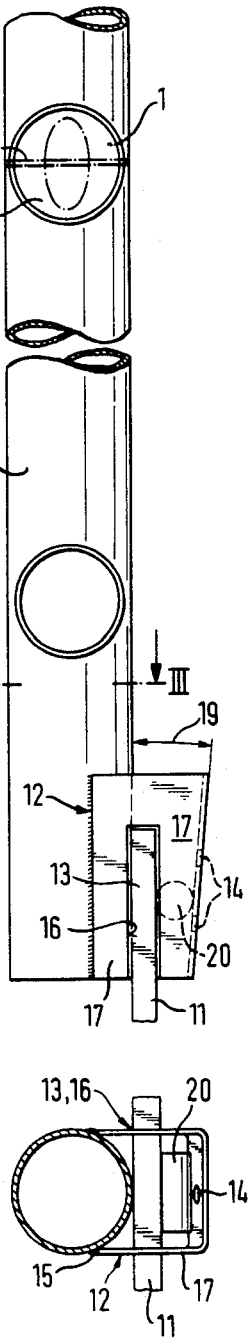
Fig. 3
Fig. 5

SUPPORT TUBE FOR A TUBULAR ASSEMBLY AND METHOD FOR THE MANUFACTURE THEREOF

Support tube for a tubular assembly and method for the manufacture thereof.

The present invention relates to a support tube for a tubular assembly, particularly a vertical post for railing, step of a ladder or the like, at least one end of which is provided with an arcuate space into which the crossing tube can be fitted. The invention also relates to a method of making such a support tube.

Tubular handrails of maintenance levels, catwalks, staircases etc. are generally made by welding. The connection points of tubes are arranged in various ways to facilitate the welding job.

To reduce the work load performed at the site of installation and to shorten the installation time, it is desirable to premanufacture the railings as large elements as transport permits.

Such manufacturing requires precise premeasuring and a lot of planning. The assemblies and anchoring points of the railings must be planned and prepared accurately. Also the railings as a separate constructional unit must be planned and dimensioned accordingly. More fitting is always left to be done in the assembly work.

Object of the invention is e.g. to overcome some of the above problems and to provide a support tube which facilitates the manufacture of tube-reinforced trussed assemblies better than the prior art solutions. For example, in the manufacture of tubular railings, the invention relies on the principle that the only railing component that is premanufactured is a vertical post which comprises a support tube of the invention and by means of which the railing can be readily constructed at the site of installation so as to comply with the particular requirements of the latter. In other words, when more attention is paid to installing and assembling possibilities of premanufactured components, the premanufacturing degree need not be extended to include the manufacture of large constructional assemblies which are bulky and hard to control.

For these objects and prupoises a tubular assembly support tube of the invention is characterized in that, at the curving edge of an arcuate space arranged at the end thereof, the tube wall is bent into a protruding support extension.

According to the invention, such a support extension arch can be manufactured in such a manner that, prior to cutting the support tube into a desired length, a hole is drilled at the cutting point thereof and the edges of said hole are pulled out to form a flange or a collar projecting from the tube followed by cutting the support tube so that the collar is divided into support extension arches which will remain at the ends of separate support tubes.

The invention will now be described with reference made to the accompanying drawings, in which:

FIG. 1 is a side view of a support tube of the invention at one of the manufacturing stages thereof, and FIG. 2 is a similar view to that of FIG. 1 but turned over 90°.

FIG. 3 shows the same tube in an end view.

FIG. 4 illustrates one application of a finished support tube, and

FIG. 5 depicts a detail of the joint between a support tube and a crossing tube.

The support extension intended for the end of a support tube 18 is produced by collaring a vertical tube centrally on either side of the tube. This is effected in a per se known manner by first drilling a hole in the side of a tube followed by pulling the hole edges into a collar projecting out of the tube. The inside measurement of collars preferably mathces the diameter of a support tube. When such collared support tube is sawn and cut through the collar center 3, the result will be two support tubes 18 with their ends provided with the abovementioned support extension 2.

When a tube or bar 4 of corresponding size is mounted in such a support extension arch 2, the result will be an assembly of two snugfitting cylinders. Securing the components to each other can be readily effected by welding the straight edges 5 of said cutting section 3 to the sides of a crossing tube. Welding can also be readily effected along the edge of support extension 2.

The support extension makes welding possible even with thin tube materials by employing a TIG method, i.e. without an additive wire, since the edge of the support extension can be melted. Such welding does not produce any undesired projecting seam.

Joining with a support extension can also be conveniently effected with a screw or pop-rivet joint 6. A tube 4 fitted in the arcuate space 1 as well as a support extension 2 are drilled simultaneously and the joint is effected by means of screws, a self-tapping tin screw or the like. The joint can also be conveniently secured through the corresponding hole with a pop-rivet or a like. Screws and rivets can be positioned in the support extension 2 below said tube 4 disposed in the arcuate space 1. Positioned this way, heads of the screws or rivets do not grab the hands or clothes since said heads will be within the corner provided by the tubes.

If desired, the support tube can be provided with one or a plurality of intermediate tubes 7 aligned with the top tube 4. Said intermediate tubes can be fitted well by providing the support tube with collars 8 located, as desired, oppositely to each other on either side of the tube.

Intermediate tubes are threaded through the thus formed holes whereby the tubes "intersect one within the other". Intermediate tube 7 and the support tube provide diagonally a very rigid assembly. The stretched collars take the supporting points 9 of the support tube wall to a substantially further location on the surface of a crossing tube than admitted by the support tube diameter.

Anchoring of the intermediate tube and the support tube to each other can be conveniently effected in a plurality of ways.

Welding and a screw joint can be employed as described in connection with the top tube. At the intermediate tube 7, said collar 8 extends around the tube which makes in inter-tube mechanical grip possible. A mechanical grip can be accomplished by pressing said collar 8 from outside with clamps, whose clamping jaw arch corresponds to the outer arch of the collar. When the clamping force is sufficient to reduce the collar diameter and to press a constriction 10 on the inside tube 7, there will be a situation in which elastic and frictional forces of the tubes keep them locked with each other.

A support tube can be most conveniently secured to the footboard 11 (toestrip) of a passageway with an anchoring bracket 12 welded to the bottom end of a support tube. Bracket 12 is mounted on the support tube so that between the support tube end and said bracket there will remain a recess 13 which matches the thickness of said footboard. Bracket 12 is provided with one or a plurality of tapped holes 14 with screws inserted therein.

The support tube is fitted on footboard 11 so that the support tube and said bracket 12 will be on different sides of the footboard 11 and the screws are tightened.

Such support tubes can be manufactured as independent units, transported to the site of installation and simply disposed at appropriate distances. A handrail is formed by inserting said intermediate tubes 7 into holes and said top tube 4 into its arcuate spaces 1. All that is needed in the site of installation is a quantity of straight tube, cutting or extending thereof. Fitting of a curved or some other kind of corner piece in the corner areas is easy, since at the stage of installation the tubes move freely endwise and the height adjustment can be effected by means of the support tube screw joints.

Handrails for paper making machines or food industrial plants are often made of stainless steel. Since the material is quite expensive, efforts are made to reduce thickness of the tubes employed. Connecting a thin tube with e.g. a footboard is troublesome by welding and bending strength for one tube wall is weak.

With the anchoring bracket 12 dimensioned so as to have its lateral edges extend near the center line of the support tube, also the tube can be reinforced this way and at the same time a good welding bevel 15 is provided.

If desired, the support tube can be readily and securely welded to the footboard by welding to the corner 16 formed between the anchoring bracket and footboard.

The anchoring bracket 12 can be considerably reinforced even with moderate material thickness by dimensioning said bracket so that in the bending operation it forms a U-beam whose side portions 17 are of sufficient length.

The anchoring bracket 12 is designed so that its outer side provides a small angle 19 in view of the support tube 18. The following advantages are gained by utilizing this angle: at the installation stage the support tubes can be readily wedged to the footboard e.g. by means of a suitable piece of flat iron. Thus, the support tube will be sufficiently gripped to hold still but are still movable.

By making use of this angle 19 and the space between anchoring bracket 12 and footboard 11 it is possible to effect anchoring of the support tube by simply dropping a suitable cylindrical body 20 into this space. When angle 19 is sufficiently small, the relative anchoring of body 20 and bracket 12 as well as footboard 11 will be self-tightening, if effort is made to lift the support member. On the other hand, if the cylindrical body 20 is knocked out of the wedge iron, the support member can be readily removed. Thus, conveniently removable and refittable handrail portions are obtained.

Although the invention has been described in connection with a tubular handrail, it is quite clear that the invention is just as well applicable to the manufacture of all kinds of trussed tubular structures. One particular application involves ladders whose steps are made of the support tubes according to the invention. Also three-dimensional crossed structures, such as masts, can be contemplated.

I claim:

1. A support structure for a tubular assembly comprising:
    a tube having one end formed into an arcuate recess arranged to receive a cross-tube, the edge of said arcuate recess being drawn into an integral protruding support, and
    an anchoring bracket secured to one end of said tube, said anchoring bracket being of U shape and extending along the sides of said tube to form a welding bevel therewith.
2. A support structure according to claim 1 in which:
    said anchoring bracket has recesses therein substantially parallel with the centerline of said support tube.
3. A support structure according to claim 1 wherein:
    said anchoring bracket has a tapered surface converging toward the end of said tube, said anchoring bracket having recesses in its U-shaped arms.

* * * * *